United States Patent [19]

Therres

[11] 3,757,453
[45] Sept. 11, 1973

[54] FISHING LINE FLOAT

[76] Inventor: John J. Therres, 7993 Atlantic Ave., White City, Oreg. 97501

[22] Filed: Dec. 7, 1971

[21] Appl. No.: 205,691

[52] U.S. Cl. .............................................. 43/43.14
[51] Int. Cl. ............................................. A01k 91/02
[58] Field of Search ........................ 43/43.14, 42.22, 43/42.35

[56] References Cited
UNITED STATES PATENTS

| | | | |
|---|---|---|---|
| 2,803,082 | 8/1957 | Claybrook | 43/43.14 |
| 3,670,447 | 6/1972 | Wohead | 43/43.14 |
| 3,664,053 | 5/1972 | Beverly | 43/43.14 |
| 2,292,517 | 8/1942 | Greene | 43/43.14 X |
| 2,955,379 | 11/1960 | Hull | 43/42.35 |
| 3,431,671 | 3/1969 | Orenick et al. | 43/43.14 X |
| 3,461,596 | 8/1969 | Green | 43/43.14 X |

FOREIGN PATENTS OR APPLICATIONS

| | | | |
|---|---|---|---|
| 955,494 | 6/1949 | France | 43/43.14 |

Primary Examiner—Louis G. Mancene
Assistant Examiner—James H. Czerwonky
Attorney—Clarence M. Crews

[57] ABSTRACT

A fishing line float is provided which, when properly combined with a line and leader can be cast to unprecedented distances. The float comprises a hollow, normally sealed shell of raindrop or cigar-shaped design. It is loaded with a determined quantity of water, insufficient to fill the shell but sufficient to fill a substantial portion of it. The float shell is designed to have the leader and line connected to its pointed end. The float shell is desirably composed of a transparent, deformable, infrangible, but elastic plastic material which has the advantage that it does not shatter when the float is caused accidentally to hit a tree, boulder or other hard object, and which has the further advantage that the float is adapted to be used as a squeeze bottle under appropriate conditions, for sucking a determined quantity of water into the float shell for loading purposes. The float has the further desirable characteristic that the line and leader trail during casting but extend downward in the water, so that tangling of line and leader are avoided.

2 Claims, 3 Drawing Figures

INVENTOR:
JOHN J. THERRES
by: Clarence M. Crews
HIS ATTORNEY

FISHING LINE FLOAT

This invention relates to fishing line floats.

It is a primary object of the invention to provide a float which facilitates and promotes long distance casting to a degree never before realized. This is achieved through the combination and coordination of several features.

The float is made of raindrop or "cigar-shaped" contour. It is a well known fact that a raindrop falling toward the ground is rounded and essentially elliptical in longitudinal section at its leading or lower end, but tapers substantially to a point at the trailing or upper end. This configuration and this attitude are naturally assumed by the raindrop because this shape and this attitude oppose the minimum retardation to flight. This has been established by aerodynamic engineers and has been taken advantage of in the construction of dirigible balloons. Air turbulence is highly objectionable and it is avoided, or substantially avoided, by the raindrop contour. For smoothest passage and minimum air resistance, air turbulance and retarding suction effects must be avoided or minimized. A raindrop is of uniform density throughout, however, and it may tend to wobble under the influence of varying air currents.

A fishing float of raindrop configuration may maintain a given attitude with greater consistency and with less tendency to wobble if it is weighted at its leading end. It is desirable to realize this increased consistency and stability in flight, but at the same time to avoid having the relatively blunt leading end be the lower end of the float in the water.

The float of the present invention is therefore formed as a hollow shell of raindrop contour, but it is made to contain, for weighting purposes, and for center of mass locating purposes, a definite quantity of water which naturally goes to the forward, blunt, rounded end in flight but is transferred to the opposite end in the water.

The blunt end during casting will quickly become the forward end for the reasons (1) that the line is attached to the pointed end of the float and this causes retardation of the pointed end; (2) that for aerodynamic reasons the large, blunt end tends to take the lead; and (3) at the outset the float shell and the contained water have momentums proportional to their respective masses. It is an important point that the float shell is retarded by the line and by air resistance whereas the float contained water is not directly retarded by these factors, so that it crowds forward in the shell and tends to carry the float shell upward and forward.

During the initial phase of casting, because the pointed end of the float is connected to the pole through the line, the rounded or nose end of the float shell is free and is urged outward by centrifugal force. The contained water is urged upward and outward by centrifugal force, so that the float quickly gains substantial altitude and high velocity in an upward and outward direction with the water lodged in the blunt, rounded end of the float. When the line ceases to pull the float upward and forward, the float travels upward and forward solely under the influence of acquired momentum. The rounded end of the float then tends to swing forward and the tail end tends to swing rearward, both because of the raindrop contour of the float, because the contained water is free to move upward and forward relative to the shell, and because the tail is retarded by the line.

For a substantial distance the float is inclined upward with the rounded or blunt end in the lead and this produces lift which increases the altitude of the float and hence the time of flight. At the same time the substantial mass in relation to air resistance, and the advantageous contour of the float favor the maintenance of a high forward velocity.

The upward tilt of the shell favors the gaining of altitude until the shell levels out. This means, of course, that the time of flight is prolonged because the time of flight increases with altitude. The range is equal to the product of time of flight by average forward velocity.

In the drawing, which shows a highly practical and advantageous illustrative form of the invention:

Figures 1, 2, 3:
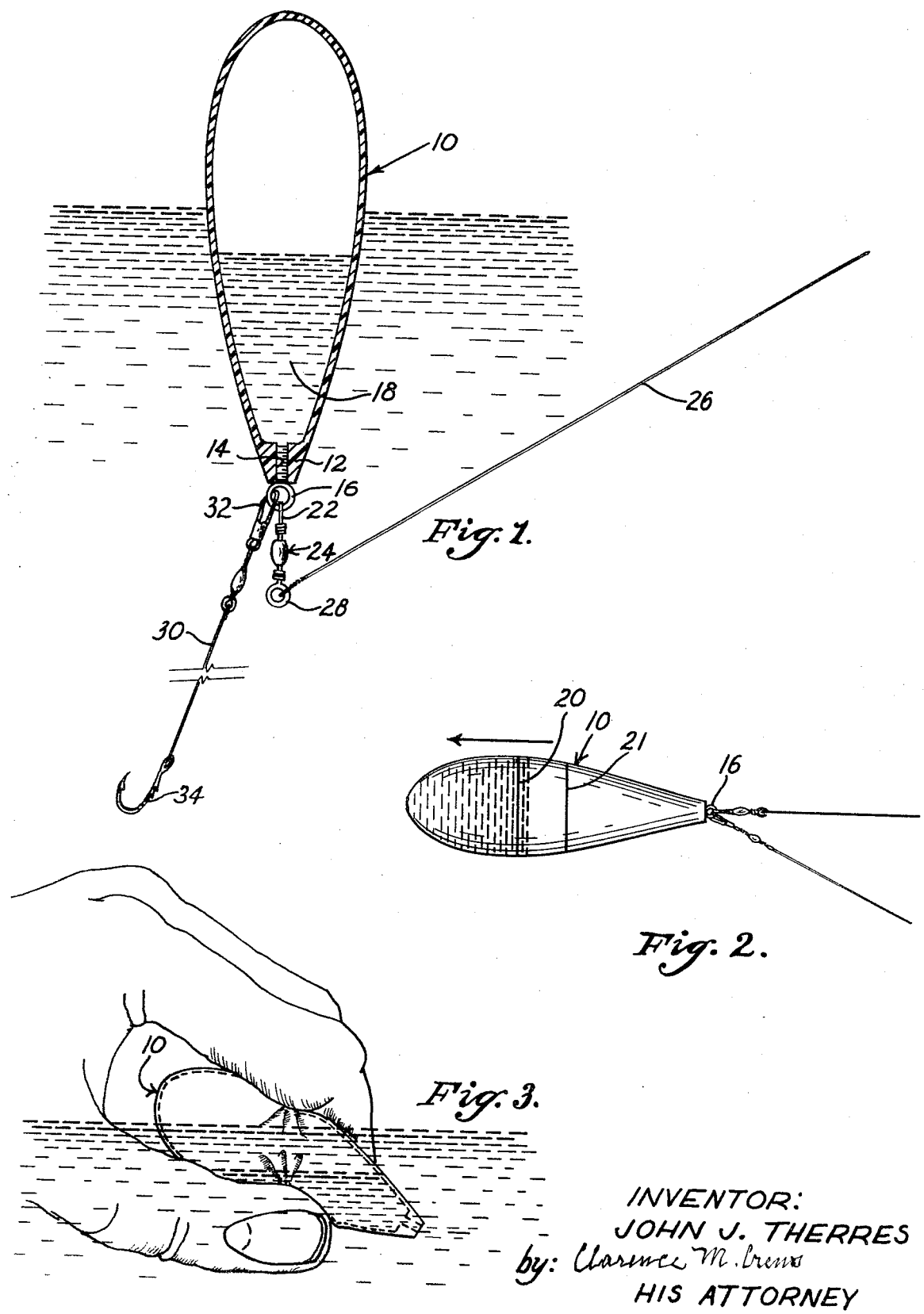
FIG. 1 is a fragmentary view on an enlarged scale, showing the float in the water with the line and leader attached to the lower pointed end of the float.
FIG. 2 is a fragmentary view showing the float, line and leader as they are disposed and related in flight.
FIG. 3 is a fragmentary view showing the float shell or casing detached from the line and leader and being used as a squeeze bottle for sucking a desired quantity of water into the float shell.

A novel fishing line float 10 is shown in the drawing as of raindrop or "cigar-shaped" design similar to that of the envelope of a Zeppelin-type rigid airship. Such a shape is illustrated in the drawing. It is further exemplified in the Encyclopedia Britannica, 1957 edition, volume 1, plates I and II following page 470. While the illustrated shape of the float is ideal or nearly so, the float could be somewhat stouter or somewhat thinner than shown and still be highly practical in configuration, so long as it has a relatively blunt, rounded leading end in flight and a smoothly merging, long, slender pointed trailing end.

The float shell is generally thin-walled and it is composed of a readily deformable but elastic material such as polyethylene. At the pointed or tail end, the float shell is made with a solid portion 12 for a short distance, and through that solid portion an internally threaded bore 14 extends. A screw-eye 16 is normally threaded through the bore 14 for sealing the interior of the hollow float, so that water 18 sealed in the float will normally be retained in a substantially leak-proof manner. If leakage should occur, the water can be replenished by withdrawing the screw-eye 16, submerging the pointed end of the float in water, squeezing the float casing and then allowing the casing to expand until the desired amount of water has been sucked in. The float casing is then withdrawn from the water, inverted and allowed to suck in air throughout its further expansion to normal.

The intake of water is illustrated in FIG. 3, but for gauging the amount of water admitted the float casing may be turned to an upright position (pointed end up). An index mark 20 indicates the minimum water level at which filling should be terminated, and a further index mark 21 indicates a maximum water level at which filling should be terminated.

The eye portion of the screw-eye 16 is interlocked with a free swivelling linkage arm 24, to the free end of which the line 26 is connected. The arm 24 has rings 22 and 28 as its opposite ends. The leader 30 is connected directly to the screw-eye through a snap buckle 32. The leader 30 carries a hook 34 and may optionally carry a sinker (not shown).

The loading of the float with water, the making of the float of raindrop or cigar-shape design, and the connection of the leader and line to the tapered, tail end of the float, all contribute to the steady and stable control of the float in flight and to the realization of maximum range.

During initial casting the rounded end of the float shell and the contained water are urged upward and outward by centrifugal force so that the float quickly gains substantial altitude and high velocity. When the line ceases to pull the float upward and forward, the rounded end of the float tends to swing forward and the tail end tends to swing rearward, both because of the raindrop contour of the float and because the tail is retarded by the line.

The travel of the shell is opposed by air resistance and by the line, but the water in the shell is retarded only by the leading end of the shell, so that the contained water tends to crowd into the rounded end of the float and to urge the rounded end of the float upward and forward and to thrust the float in its entirety upward and forward. At the same time, the pointed end of the shell has a drag exerted upon it by the unreeling line. All these factors act harmoniously to maintain the float in an upwardly inclined attitude which favors lift and minimizes air resistance.

Eventually, of course, gravity gains the ascendancy over waning momentum and the float lands in the water. The weight of the line and leader pulls the line-and-leader connected end of the float down and hold them down.

I have described what I believe to be the best embodiment of my invention. What I desire to protect by letters patent is set forth in the following claims.

I claim:

1. A fishing line float consisting essentially of only,
   a. a hollow integral shell of substantially raindrop contour, having a relatively blunt, smoothly rounded, permanently closd free end and merging with a smoothly tapering, relatively pointed, open end, in which shell a determined quantity of water will normally be retained in a substantially leak-proof manner, and for completing the float
   b. a removable sealing plug separably secured in and to the pointed open end of the shell, said plug alone having connecting means mounted on one end thereof and, to which a line and a leader may be separably and exclusively attached, the construction and arrangement being such that the pointed end of the shell will trail during casting, but the shell, when afloat, naturally will assume an upright attitude with the pointed, line-and-leader connected end down, and the float capable of being completely separated from the line and leader for readjustment of water content by the mere removal of the plug.

2. A fishing line float as set forth in claim 1 in which the hollow shell is devoid of contents other than water, and is formed of a yieldable, elastic, infrangible transparent material, the construction and arrangement being such that the shell and its contents will be unimpaired by violent contact with a hard object, and the shell can be used as a squeeze bottle detached from the leader and line by the mere withdrawal of the plug, for loading the shell with water.

* * * * *